United States Patent [19]
Hess et al.

[11] 3,878,137
[45] Apr. 15, 1975

[54] CURABLE MOLDING COMPOSITIONS BASED ON UNSATURATED POLYESTERS AND CONTAINING ACID CELLULOSE ESTERS AND POLYSTYRENE

[75] Inventors: Bernhard Hess, Kapellen-Moers; Karl Raichle, Krefeld-Bockum, both of Germany; Bayer

[73] Assignees: Aktiengesellschaft, Leverkusen, Germany

[22] Filed: Sept. 13, 1973

[21] Appl. No.: 397,142

[30] Foreign Application Priority Data
Sept. 20, 1972 Germany............................ 2246105

[52] U.S. Cl. ................................................. 260/16
[51] Int. Cl............................................. C08g 39/10
[58] Field of Search ........................................ 260/16

[56] References Cited
UNITED STATES PATENTS
3,642,672  2/1972  Kroekel ................................ 260/16
3,772,241  11/1973  Kroekel ................................ 260/40

FOREIGN PATENTS OR APPLICATIONS
937,703  9/1963  United Kingdom................. 260/862
936,351  9/1963  United Kingdom................. 260/862

Primary Examiner—Morris Liebman
Assistant Examiner—Edward Woodberry
Attorney, Agent, or Firm—Connolly and Hutz

[57] ABSTRACT

The invention relates to moulding compositions based on olefinically unsaturated polyesters, containing acid cellulose esters and polystyrene, which can be cured to give homogeneously coloured mouldings of low shrinkage.

10 Claims, No Drawings

CURABLE MOLDING COMPOSITIONS BASED ON UNSATURATED POLYESTERS AND CONTAINING ACID CELLULOSE ESTERS AND POLYSTYRENE

The invention relates to moulding compositions based on olefinically unsaturated polyesters, containing acid cellulose esters and polystyrene, which can be cured to give homogeneously coloured mouldings of low shrinkage.

It is known that the shrinkage of heat-cured compression moulding compositions based on solutions of polyesters containing olefinically unsaturated dicarboxylic acid radicals — referred to for brevity as unsaturated polyesters — in copolymerisable vinyl monomers can be considerably reduced, and that their surface can be improved, by combination with thermoplastics. Known combinations of this nature are manufactured, for example, by mixing two solutions A and B consisting, on the one hand, of the clear solution of an unsaturated polyester in styrene (solution A) and, on the other hand, the clear solution of a thermoplastic in styrene (solution B). The mixture can be compatible or incompatible; thus, on mixing either a clear solution or a more or less stable dispersion is produced.

To manufacture a compression moulding composition, glass fibres, fillers and peroxide, and frequently also chemical thickeners, for example oxides or hydroxides of a metal of group II of the periodic system, such as magnesium oxide or calcium oxide or hydroxide, which consolidates the composition through salt formation, are added to the mixture of the solutions A and B. The compression moulding composition is heat-cured to give mouldings.

The most streamlined method of manufacture of larger pressings is via thickened resin mats. These are manufactured by impregnating glass fibre mats with the glass-free mixture described, which contains chemical thickeners, especially MgO, and protecting the surfaces of the mats on both sides by covering films. The films prevent the evaporation of the vinyl monomer and permit the mats to be rolled up and hence to be stored in a space-saving way. The expectations from a good resin mat are that it thickens up after not more than 5 days' storage at room temperature, that its surface is then almost dry, so that the covering films adhering to both sides can be pulled off without great exertion of force and without damaging the mat, and that the mat can be hot-pressed to give perfect mouldings.

As explained below, using the previously known combinations of thermoplastics with solutions of unsaturated polyesters in copolymerisable vinyl monomers it is not possible to manufacture a resin mat having the good properties mentioned, which can be pressed to give mouldings which are perfectly coloured and have been cured with little shrinkage and have a perfect surface.

Amongst the thermoplastics which can be considered, the use of cellulose acetobutyrate (C.A.B.) and/or cellulose acetopropionate (C.A.P.) in combination with highly reactive unsaturated polyesters in copolymerisable vinyl monomers is known from German Offenlegungsschriften (German Published Specifications) 1,694,857 and 1,953,062. Our own comparison experiments have shown that whilst it is possible to manufacture resin mats with a sufficiently dry surface on the basis of neutral or of acidified CAB/CAP in combination with styrene solutions of highly reactive unsaturated polyesters, the cured mouldings manufactured from these mats display, in dark colourations, an unattractive flecked marbled appearance, which is why additional lacquering frequently becomes necessary.

Comparison experiments with neutral polystyrene as the thermoplastic (according to DOS 1,694,898) showed the difficulty that the mixture of the solution A — unsaturated polyester in styrene — with the solution B — polystyrene dissolved in monomeric styrene — formed a dispersion which soon separated again into two phases and furthermore that the resin mats manufactured therefrom were still tacky after 5 days' storage at room temperature, so that the covering films could only be pulled off with difficulty and so as to damage the resin mat, and that the cured mouldings, whilst homogeneously coloured, showed surface blotches and left a deposit in the press.

The same difficulties on mixing the solutions A and B and adverse properties of the cured mouldings manifested themselves to an increased extent in comparison experiments with acid polystyrene as the thermoplastic (according to DOS (German Published Specification) 1,953,062) or with styrenemaleic anhydride copolymers (according to U.S. Pat. No. 3,665,055), except that here the resin mat, as positive feature, showed a dry surface.

It has now been found that moulding compositions based on solutions of olefinically unsaturated polyesters in copolymerisable vinyl monomers, which contain a thermoplastic mixture consisting of acid CAB and/or CAP on the one hand and small amounts of neutral and/or acid polystyrene on the other, form a stable dispersion and yield resin mats with dry surfaces which can be pressed to give homogeneously coloured low shrinkage mouldings of perfect surface. This is all the more surprising since comparison experiments with a mixture of thermoplastics, consisting of neutral CAB and neutral polystyrene, do not yield homogeneously coloured mouldings. (Compare Table 1).

The invention hence relates to moulding compositions which can be cured to give homogeneously coloured mouldings of low shrinkage, and which consist of mixtures of 1. Polyesters containing α,β-unsaturated dicarboxylic acid radicals,
2. Copolymerisable vinyl monomers,
3. Customary polymerization inhibitors, in the customary amounts,
4. Customary polymerisation initiators, in the customary amounts,
5. Pigments,
6. Optionally, chemical thickeners, especially those based on oxides or hydroxides of a metal of group II,
7. Optionally, agents for conferring thixotropy,
8. Other customary additives and auxiliaries, characterised in that they contain
9. 5–30% of acid cellulose acetobutyrate (CAB) and/or acid cellulose acetopropionate (CAP), relative to the resin mixture without (5) and (8), and
10. 1–15% of polystyrene.

The above and subsequent percentage data are percentages by weight.

The mixtures according to the invention also differ externally from the previously known combinations of this nature, which are usually manufactured by mixing two clear solutions A and B — solution A: unsaturated polyester in styrene; solution B: thermoplastic in styrene — in that the solution B is not a clear solution but a dispersion which consists of the mixture of two thermoplastics which are incompatible in styrene. This dispersion in most cases remains stable on further mixing with the solution A and can be converted into mouldings having the optimum properties described.

Unsaturated polyesters are the customary polycondensation products of $\alpha,\beta$-unsaturated dicarboxylic acids with polyols, especially glycols (compare J. Bjorksten et al. "Polyesters and their Application" Reinhold Publishing Corp., New York, 1956). Amongst these, the highly reactive polyesters, that is to say those with as high a content of olefinically unsaturated groups as possible, are preferred, since they yield the products of best quality. Such highly reactive polyesters can be obtained in a manner which is in itself known by using, as glycols, those of as low a molecular weight at possible, such as ethylene glycol or propylene glycol, and condensing these exclusively with $\alpha$-$\beta$-unsaturated dicarboxylic acids or with mixtures of these dicarboxylic acids which contain as little as possible of other dicarboxylic acids which are devoid of olefinically unsaturated groups, such as phthalic acid, terephthalic acid and aliphatic dicarboxylic acids. The preferred amount of unsaturated polyesters is about 25–50% of the resin mixture without fillers and pigments.

Copolymerisable vinyl monomers are the customary vinyl monomers, preferably styrene, nuclear-substituted styrenes or divinylbenzene, optionally mixed with smaller amounts of acrylic acid or methacrylic acid or their esters, esters of vinyl alcohol or allyl alcohol and the like. The preferred amounts are 40–60% of the resin mixture without fillers and pigments.

Acid CAB and CAP are cellulose esters in which at least half the hydroxyl groups of the cellulose which are capable of esterification are esterified with butyric acid or propionic acid, a further part is esterified with acetic acid and the remaining hydroxyl groups of the cellulose are esterified at least partially so as to form an acid half-ester, for example by reaction with an acid anhydride, such as anhydrides of phthalic acid, tetrahydrophthalic acid, trimellitic acid or pyromellitic acid. Cellulose acetobutyrates containing about 17–21% of acetic acid and about 45–50% of butyric acid, which possess acid numbers of about 10 to 80, are particularly suitable.

Of course, acid groups can also be introduced into the cellulose through other chemical reactions, for example by reaction with chloroacetic acid. The reaction with the acid anhydrides can be carried out in styrene solutions at an elevated temperature, the polymerisation of the sytrene being prevented by adding a sufficiently large amount of inhibitors. However, the reaction can also be carried out in inert solvents though these have to be removed again.

The acid CAB and/or CAP can be employed in amounts of about 5–30% of the resin mixture without filler and pigments, preferably in amounts of 10–20%.

Suitable polystyrenes are: the customary homopolymers of styrene with molecular weights of 5,000 to 10,000,000, but preferably those with molecular weights of about 20,000 to 300,000, and also copolymers of styrene with small amounts of one or more monomers such as $\alpha$-methylstyrene, vinyltoluene, tert.-butylstyrene, chlorostyrene, butadiene, acrylic or methacrylic acid, their esters or amides, hydroxypropyl methylacrylate, acrylamide, $\beta$-methacryloxyethylsulphonic acid or -phosphoric acid, or neutral or acid esters of maleic acid or fumaric acid.

Through the comonomers described, the copolymer can contain functional groups. These can be present in amounts of 0.02–2 mequivalent/g, preferably 0.05–1.0 mequivalent/g.

Polystyrenes which have been manufactured in the presence of the acid or neutral CAB or CAP in styrene solution are particularly advantageous since this procedure results in particularly stable and fine dispersions.

Frequently, an amount of polystyrene of 2% relative to the resin mixture without fillers and pigments suffices, but larger amounts, up to 15%, can also be of advantage.

The mixtures according to the invention contain customary inhibitors which prevent a premature uncontrolled gelling such as: hydroquinone, toluhydroquinone, p-benzoquinone, p-tert.-butylpyrocatechol, chloranil, naphthoquinone, copper compounds, p-nitrosodimethylaniline and the like.

Customary radical-forming initiators are added thereto, such as benzoyl peroxide, tert.-butyl perbenzoate, tert.-butyl peroxide, cyclohexanone peroxide, tert.-butyl peroctoate and azoisobutyrodinitrile.

Known chemical thickeners are the oxides and hydroxides of the metals of group II, preferably the oxides and hydroxides of magnesium and calcium, optionally in conjunction with small amounts of water.

Suitable pigments and dyestuffs are the customary pigments and dyestuffs which do not interfere with the polymerisation, and can be organic or inorganic coloured pigments, such as iron oxide in various colour shades, chromium oxide, cadmium sulphite or phthalocyanines, usually in combination with white pigments such as titanium dioxide, zinc oxide or lithopone.

Agents for conferring thixotropy are the usual ones, which may be inorganic, such as Aerosil, or organic, which contain acid amide or urethane groups, or cyclohexylamides of higher fatty acids (compare DAS (German Published Specification) 1,182,816 and 1,217,611, and BE 693,580).

Other customary additives and auxiliaries are inert inorganic fillers such as calcium carbonate, silicates, aluminas, chalk, carbon, reinforcing fibres such as glass fibres, also in the form of fabrics or mats, synthetic organic fibres, cotton, asbestos or metals, lubricants and release agents, such as zinc stearate, and UV-absorbers.

To manufacture the moulding compositions according to the invention, fillers, chemical thickeners, pigments, initiators and glass fibres can be mixed into the resin mixture, consisting of the solutions A and B, in a kneader — or a mortar in the case of hand experiments — or glass fibre mats or fabrics can be impregnated with the composition which is free of glass fibres and left to ripen for 5 days at room temperature, whilst preventing major amounts of the vinyl monomer from evaporating, through suitable measures (for example sealed containers and covering films). The moulding compositions thickened according to the invention have a dry, non-tacky surface and can be heat-cured to give homogeneously coloured low shrinkage mouldings having perfect glossy surfaces.

The examples and comparison examples which follow explain the invention.

EXAMPLES

Parts denote parts by weight, and viscosity data are measurements in the Hoppler falling ball viscometer.

Manufacture of Solution A

Solution A is the sytrene solution of an unsaturated polyester, the composition of which is given below. The polyester is manufactured in a known manner by melt condensation and is dissolved in styrene to give a 65% strength solution. Before dissolving it, toluhydroquinone is added.

| | |
|---|---|
| Maleic anhydride | 932 g |
| Phthalic anhydride | 74 g |
| 1,2-Propylene glycol | 852 g |
| Toluhydroquinone | 0.33 g |
| Characteristic data of the styrene solution: | |
| Solids content | 65% |
| Viscosity (20°C) | 2,200 cP |
| Acid number | 17 |

Manufacture of Solution B

For the examples and comparison experiments which follow, a cellulose acetobutyrate, hereafter referred to as CAB I, was used, which had a viscosity of 0.1 second according to ASTM-D 871-56, equation B, contained 18% of acetic acid and 45% of butyric acid, and had an OH number of 60.

Composition of the solution B 1 according to the invention, and of the comparison solutions B 2 to B 5, in parts by weight:

| Solution: | B 1 | B 2 | B 3 | B 4 | B 5 |
|---|---|---|---|---|---|
| CAB I | 120 | 120 | 120 | — | 120 |
| Styrene, Part I | 180 | 180 | 180 | 180 | 180 |
| Phthalic anhydride | 13 | — | 13 | — | — |
| Toluhydroquinone | 0.1 | 0.1 | 0.1 | 0.1 | 0.1 |
| Polystyrene (molecular weight 70,000) | 40 | — | — | 160 | 40 |
| Styrene, Part II | 100 | 100 | 100 | 100 | 100 |

The CAB I and toluhydroquinone are dissolved in styrene, Part I, at 80°C, phthalic anhydride is then added, and the solution is warmed to 100°C and kept at 110°C for 3 hours. Into the clear solution, cooled to 40°C, is stirred the solution, which is also clear, of the polystyrene dissolved in styrene, Part II, whereby a fine dispersion is produced which represents solution B. In the case of the comparison solutions without phthalic anhydride, the 3 hours' warming to 110°C is omitted.

Manufacture of the Mixtures of Solutions A and B 60 parts of solution A are mixed with 40 parts of solution B at room temperature. The mixture according to the invention of solutions A and B 1 is a stable dispersion (Example 1), and the comparison mixtures are in part clear solutions and in part dispersions of varying stability (Examples 1a to 1d).

The properties of the mixtures and those of the moulding compositions manufactured therefrom and of the cured mouldings are summarised in Table I.

Manufacture of Moulding Compositions

The ease of colouration of moulding compositions is assessed in relation to a cured red-brown resin composition:

100 parts of the mixture of solutions A and B according to the invention and 100 parts of the comparison mixtures of solutions A and B are intimately mixed with the additives listed below, and 66 parts of a glass fibre mat are impregnated with the composition and protected on both sides with covering films. After 5 days' storage at room temperature the covering films are pulled off and portions of 125 parts of the thickened-up resin mat are pressed for 5 minutes at 145°C under 120 kp/cm$^2$ to give sheets (12 × 12 cm) having a diagonal rib and a nap. The pressings all show the known low shrinkage in comparison to moulding compositions free of thermoplastic. The properties of the resin mats and of the cured mouldings are listed in Table I

| | |
|---|---|
| 100.0 | parts of a mixture of solutions A and B |
| 80.0 | parts of calcium carbonate |
| 1.5 | parts of MgO |
| 4.0 | parts of zinc stearate |
| 1.65 | parts of black iron oxide |
| 3.35 | parts of red iron oxide |
| 0.75 | part of tert.-butyl perbenzoate |
| 0.4 | part of water |
| 66.00 | parts of glass fibre mat |

Table I

| Example/ Comparison | Solution A + B | Viscosity of Solution A + B | Thermoplastic | Mixture Solution A + B | Resin mat | Colouration of the Moulding | Surface of the Moulding |
|---|---|---|---|---|---|---|---|
| No. 1 | A + B 1 | 4,000 cP | Acid CAB I + polystyrene I | cloudy/stable | dry | homogeneous | gloss |
| No. 1 a | A + B 2 | 4,500 cP | CAB I | clear/stable | dry | inhomogeneous | gloss |
| No. 1 b | A + B 3 | 4,300 cP | Acid CAB I | clear/stable | dry | inhomogeneous | gloss |
| No. 1 c | A + B 4 | 1,500 cP | Polystyrene I | cloudy/unstable | tacky | homogeneous | blotches |
| No. 1 d | A + B 5 | 4,000 cP | CAB I + polystyrene I | cloudy/stable | dry | inhomogeneous | gloss |

EXAMPLE 2

Manufacture of Solution B6 according to the Invention:

| | | |
|---|---|---|
| CAB I | 120 | parts |
| Styrene | 280 | parts |
| Phthalic anhydride | 13 | parts |
| Toluhydroquinone | 0.01 | part |

The CAB I, phthalic anhydride, and toluhydroquinone are dissolved in styrene at 80°C and the solution is warmed to 110°C. After approx. 1 hour, the clear solution becomes cloudy and after a further 2 hours at 110°C the solution is cooled to room temperature. Approx. 40 parts of polystyrene have formed, as found by determining the solids content.

60 parts of the solution A are mixed with 40 parts of the solution B6. The viscosity of the mixture is 5,700 cP. The mixture is a stable dispersion which can be converted to give a resin mat corresponding to the formulation described above and having a dry surface; after 5 days' storage at room temperature this mat can be cured to give homogeneously coloured mouldings of low shrinkage and fault-free surface.

What we claim is:

1. A curable moulding composition comprising 20–50% by weight of an unsaturated polyester of an α,β-unsaturated dicarboxylic acid and a polyol; 40–60% by weight of a copolymerizable vinyl monomer; a polymerization inhibitor; a pigment; a polymerization initiator; 5–30% by weight of an acid cellulose ester selected from the group consisting of acid cellulose acetobutyrate and acid cellulose acetopropionate, each said acid cellulose containing carboxylic acid groups, and 1–15% by weight of polystyrene, said percentages by weight being based on the total weight of the composition minus the weight of said pigment.

2. The composition of claim 1 wherein said at least one acid cellulose ester is present in an amount of 10–20% by weight.

3. The composition of claim 1 wherein said polystyrene has been produced in the presence of said at least one acid cellulose ester in a styrene solution.

4. The composition of claim 1 wherein said polystyrene has a molecular weight of 5,000 to 10,000,000.

5. The composition of claim 1 wherein said polystyrene is a copolymer of styrene and a minor amount of at least one monomer selected from the group consisting of α-methylstyrene, vinyltoluene, tert.-butylstyrene, chlorostyrene, butadiene, acrylic acid, methacrylic acid, the esters and amides of said acids, hydroxypropylmethacrylate, β-methacryloxyethylsulfonic acid, β-methacryloxyphosphoric acid and the neutral and acid esters of maleic and fumaric acids.

6. The composition of claim 1 wherein said at least one acid cellulose ester is acetobutyrate containing 17–21% of acetic acid and 45–50% of butyric acid and having an acid number of 10–80.

7. The composition of claim 1 including a chemical thickener which is an oxide or a hydroxide of a metal of Group II of the Periodic System.

8. The composition of claim 1 which includes an inert filler.

9. The method of producing a hardened composition which comprises curing the composition of claim 1.

10. The hardened composition produced by the method of claim 9.

* * * * *

UNITED STATES PATENT OFFICE
CERTIFICATE OF CORRECTION

PATENT NO. : 3,878,137
DATED : April 15, 1975
INVENTOR(S) : Bernhard Hess et al

It is certified that error appears in the above-identified patent and that said Letters Patent are hereby corrected as shown below:

The title page, left hand column, the last line of [75] should read -- of Germany -- and the first line of [73] should read -- Assignees: Bayer Aktiengesellschaft, Leverkusen, --.

Signed and Sealed this seventh Day of October 1975

[SEAL]

Attest:

RUTH C. MASON
Attesting Officer

C. MARSHALL DANN
Commissioner of Patents and Trademarks